No. 813,495.　　　　　　　　　　　　　　　　　PATENTED FEB. 27, 1906.
S. P. GLUNT.
METHOD OF SEPARATING BUCKHORN AND PLANTAIN SEED FROM CLOVER
AND ALFALFA SEED.
APPLICATION FILED SEPT. 21, 1905.

Witnesses:
Wm H. Mote
A. Glunt

Samuel Perry Glunt
Inventor.

UNITED STATES PATENT OFFICE.

SAMUEL PERRY GLUNT, OF UNION CITY, INDIANA.

METHOD OF SEPARATING BUCKHORN AND PLANTAIN SEED FROM CLOVER AND ALFALFA SEED.

No. 813,495. Specification of Letters Patent. Patented Feb. 27, 1906.

Application filed September 21, 1905. Serial No. 279,411.

*To all whom it may concern:*

Be it known that I, SAMUEL PERRY GLUNT, a citizen of the United States, residing at Union City, in the county of Randolph and State of Indiana, have invented a new and useful Improvement in Methods of Separating Buckhorn-Seed and Plantain-Seed from Clover-Seed and Alfalfa-Seed, of which the following is a specification.

This invention relates to an improved method of separating buckhorn-seed and plantain-seed from clover-seed and alfalfa-seed.

In the accompanying drawings, forming a part of this specification, there are illustrated a number of implements which may be used in carrying the method into effect, it being understood that the invention may be otherwise carried out and still be within the scope.

Figure 1:
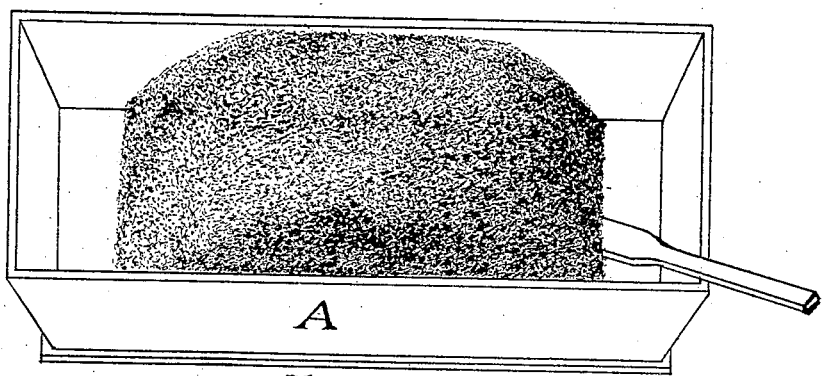
Figure 2:
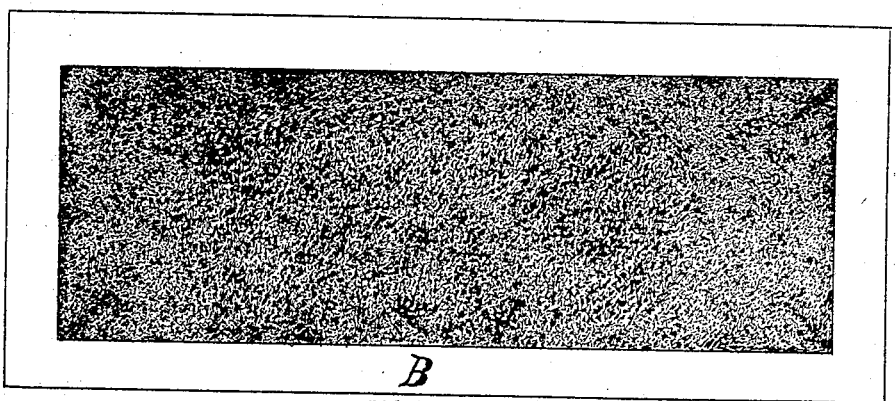
Figure 3:
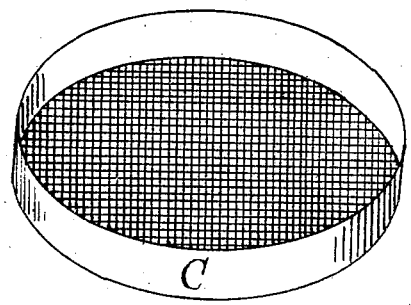
Figure 4:
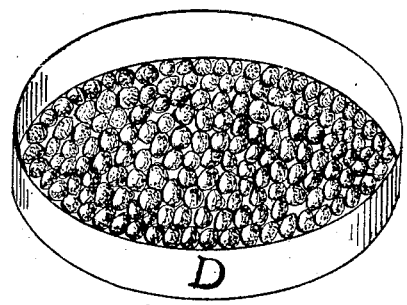

In the drawings, Figure 1 is a view in perspective of a tray or receptacle in which sawdust or other separating or purifying material is first placed and then dampened, but not so much that water may be pressed therefrom by the hand. With this dampened sawdust a like quantity of clover-seed containing buckhorn or plantain seed is mixed and thoroughly stirred with a stick or paddle. Fig. 2 represents a canvas upon which the mixture of seeds and dampened sawdust are spread to dry, the process requiring from thirty minutes to two hours. Fig. 3 is a perspective view of a screen or sieve with meshes large enough to admit of the passage of all clover-seed. The mixture of seeds and sawdust when dry is screened with this sieve. Fig. 4 represents the same sieve as the one marked C in Fig. 3 after the mixture of seeds and sawdust have been, as far as possible, passed through it.

Owing to the fact that the moisture contained in the sawdust causes a gluey substance to form on the surface of buckhorn and plantain seeds, the sawdust coming in contact with the buckhorn and plantain seeds adheres thereto and forms balls with a buckhorn or plantain seed in the inside of each ball. These balls are therefore too large to pass through the screen, thereby remaining inside the screen or sieve, as shown in D, Fig. 4. These screenings or balls containing the buckhorn and plantain seeds are then destroyed. In the operation of screening most of the sawdust passes through the screen with the clover-seed and must be separated therefrom. This separation is effected by passing the mixture of clover-seed and sawdust through an ordinary fanning-mill, by which the sawdust is blown out and the work is complete.

Owing to the fact that all fanning-mills are equipped with screens, the use of the hand sieve or screen C in Fig. 3 and the like sieve or screen shown in Fig. 4 and marked D may be dispensed with, and the mixture of sawdust, clover-seed, buckhorn-seed, and plantain-seed when dry may be passed at once through the fanning-mill and the work is complete.

The object of the invention is without the employment of expensive machinery and in a thoroughly practical and certain manner to separate buckhorn-seed and plantain-seed from clover-seed and alfalfa-seed. As is well known, the presence of buckhorn-seed and plantain-seed in clover-seed and in alfalfa-seed renders the latter two varieties of grass-seed almost valueless to farmers and, moreover, greatly reduces their selling price to seedmen.

The present invention is based upon a discovery, the result of many experiments, of the sticky or gluey nature of buckhorn-seed and plantain-seed when brought into contact with moisture. Owing to the fact that buckhorn-seeds and plantain-seeds are of so nearly the same size as clover-seeds and alfalfa-seeds they have never been successfully separated from the latter two kinds of grass-seeds by the use of a screen, and owing to the fact that buckhorn-seeds and plantain-seeds have so nearly the same specific gravity as clover-seeds and alfalfa-seeds they have never been successfully separated from the latter two kinds of grass-seeds by blowing or fanning. I have discovered that by mixing with clover-seed or alfalfa-seed which contains buckhorn-seed or plantain-seed dampened or moistened sawdust, cornmeal, meal or dust of any kind, or any small seeds that such dampened dust, meal, or seeds by the moisture they contain cause the buckhorn-seeds and plantain-seeds by their sticky or gluey nature to readily adhere to the dust, meal, or small seeds, thus enlarging the buckhorn-seeds and plantain-seeds, forming small balls which are readily separated from the clover-seed or alfalfa-seed by the use of any ordinary sieve or screen containing the proper sized mesh. The free dust, meal, or seeds remaining with the clover-seed or alfalfa-seed may then be readily removed by the use of any ordinary fanning-mill.

The invention consists in mixing with clover-seed or alfalfa-seed containing buckhorn-seed or plantain-seed dampened sawdust, cornmeal, or meal or dust of any kind, or any small seeds, sawdust being the preferable purifying agent, owing to its perfect results and owing to its cheapness, stirring thoroughly and spreading on a canvas or tight floor until nearly dry, then sifting or screening with any sieve or screen with proper mesh to let the clover-seed or alfalfa-seed pass through, but retaining the buckhorn-seed or plantain-seed, enlarged by its adherence to the dampened purifying agent, by spreading the screened clover-seed or alfalfa-seed upon a canvas or tight floor until dry and then passing through any ordinary fanning-mill, thus separating from the clover-seed or alfalfa-seed any free particles of the purifying agent, sawdust again being preferable, owing to the lightness of it and the ease with which it is separated from the seed by fanning. In the procedure observed a positive separation of the buckhorn-seed and the plantain-seed from the clover-seed or the alfalfa-seed is secured, and the clover-seed or alfalfa-seed thus treated will always bring the highest market price, while clover-seed or alfalfa-seed containing buckhorn-seed or plantain-seed often sells for but little more than the cost of threshing, and quite frequently seedmen refuse to buy it at any price.

Having thus described the invention, what is claimed is—

The herein-described method of separating buckhorn-seeds and plantain-seeds from clover-seed or alfalfa-seed consisting in mixing with the clover-seed or the alfalfa-seed which contains buckhorn-seed or plantain-seed, dampened sawdust, then spreading the seed on a canvas or tight floor to partially dry, then passing the seed through a screen, then spreading the screened seed out to dry, and finally passing the screened seed through a fanning-mill.

In testimony that I claim the foregoing as my own I have hereto affixed my signature in the presence of two witnesses.

SAMUEL PERRY GLUNT.

Witnesses:
JAMES B. McKENZIE,
WEBSTER LAMBERT.